Figure 3:
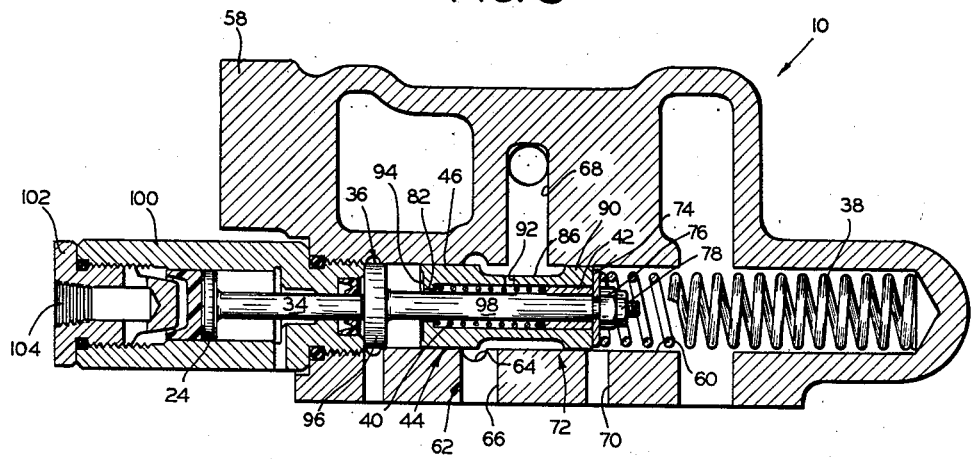

Aug. 4, 1964
B. L. FROST
3,143,127
REGULATING VALVE
Filed Nov. 7, 1962
2 Sheets-Sheet 1
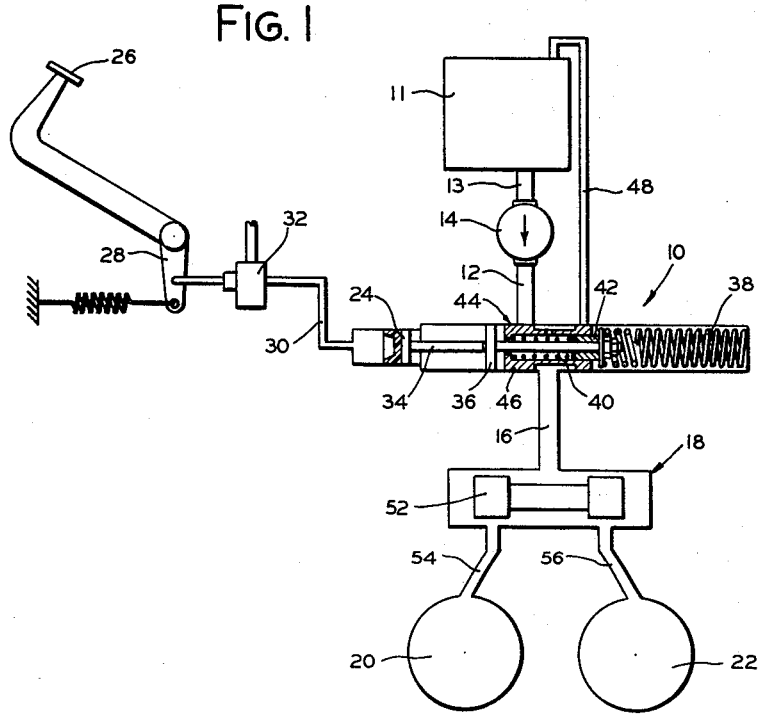
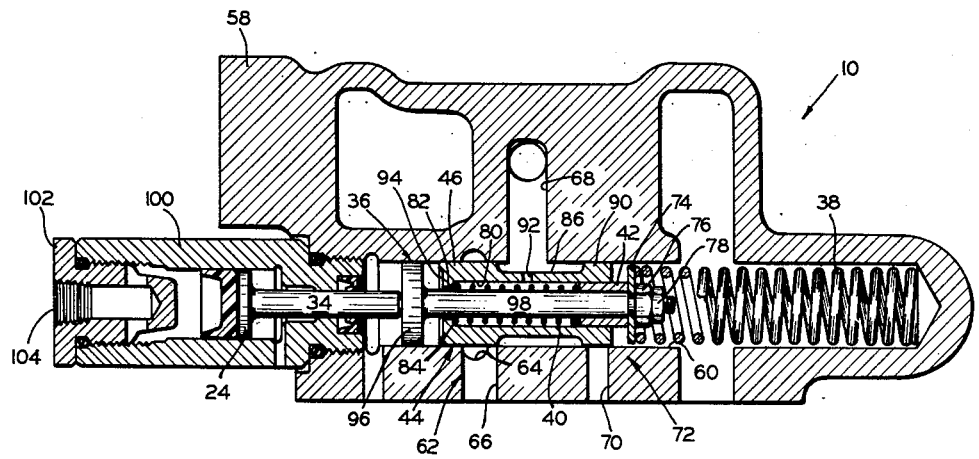
INVENTOR
BARRY L. FROST
BY Kenneth C. Witt
ATTORNEY INVENTOR
BARRY L. FROST
BY Kenneth C. Witt
ATTORNEY

United States Patent Office 3,143,127
Patented Aug. 4, 1964

---

3,143,127
REGULATING VALVE
Barry L. Frost, Jackson, Mich., assignor to Clark Equipment Company, a corporation of Michigan
Filed Nov. 7, 1962, Ser. No. 236,020
6 Claims. (Cl. 137—116.3)

This invention relates to improvements in valve means for use in fluid operated control systems. More particularly, the valve means of this invention is constructed to control and regulate fluid pressures, and it may be disposed, for example, between a source of pressurized fluid and a device operated thereby such as a transmission clutch.

Briefly, this invention constitutes an improvement in so-called "inching" control valve mechanisms. Such control valve mechanisms may be used in regulating pressure to a fluid operated clutch of the type found in the transmissions of industrial lift trucks and other machines. Specifically, such a control valve means is frequently constructed to permit an immediate relief of a portion of the clutch application pressure followed by regulated decrease or increase in the pressure fluid supplied to a fluid operated clutch whereby the latter may be gradually disengaged or engaged by the operator. One particular use of this type of regulating valve, as mentioned, contemplates the control of a fluid pressure actuated clutch for the transmission of an industrial lift truck. In such a vehicle, it is often necessary to hold the truck stationary while the lift fork or like material engaging device is operated at a speed corresponding to full engine speed without shifting the transmission to the neutral position. It is desirable in such circumstances to be able to "inch" the vehicle forwardly or reversely, as desired, to make possible its accurate positioning and the handling of material.

Conventionally, the vehicle transmission has been kept in gear and the brakes of the vehicle have been employed to control "inching" of the vehicle. This method of control is undesirable because it requires considerable pressure to be applied to the brake pedal by the operator of the vehicle and also causes undersirable wear of the brake linings.

Various control and regulating valves for performing the above-stated function in conjunction with power shifted transmissions employing fluid pressure actuated transmission clutches have been disclosed previously as exemplified by U.S. Patent No. 2,950,734 issued August 30, 1960.

In order to carry out the above-mentioned "inching" feature, valve means, such as described in the above-identified patent, have been provided to effect improved gradual engagement and disengagement of the vehicle clutch after relief of excess pressures in the system by operating such valve means in conjunction with the application and release of the vehicle brake system. The operation of such valve means may be either hydraulic by application of fluid pressure in the brake system, or mechanical by means of a linkage connection with the brake pedal of the vehicle. In such structures when the brakes are actuated the valve means shifts to a position partially interrupting fluid flow to a clutch control valve and effects controlled partial deactuation of the clutch means by maintaining a relatively low fluid pressure, thus providing control of the torque to the wheels of the vehicle. When the brake pedal is released, the valve means is returned to its normal position reestablishing full communication between the clutch control valve and the source of fluid under pressure, and therefore full fluid pressure on the clutch. As a result of the above arrangement, drive between the input and output shafts of the vehicle transmission may be controlled to permit "inching" of the vehicle without interfering with the operation of raising and lowering the load.

The valve means of the present invention constitutes an improvement upon the structure of the above-identified patent by providing, among other things, a single diameter bore in the valve body, a spool construction that permits the use of a stronger regulating spring for more positive and accurate operation, and a construction which provides positive positioning of the spool member at extreme operating positions to nullify the effects of any tendency of the spool member to stick. The present invention may be generally characterized as an improved arrangement of a spool type valve having a suitable porting system and a novel two-piece spool disposed therein so as to provide an accurate, but rugged, valve means capable of relieving over pressures to gain a workable pressure which is thereafter regulated to control a transmission clutch of a vehicle such that the pressure of the clutch or other control device is balanced against a regulating spring in order to regulate the clutch pressure automatically at a value responsive to the position of the brake pedal or other controlling device.

With the foregoing in mind, it is a primary object of the present invention to provide new and improved regulating valve means having pressure relief and regulating features for use in fluid operated control systems.

Another object of the present invention is to provide an improved regulating valve means having a single diameter bore.

A further object of my invention is to provide an improved regulating valve that is constructed so that if the spool sticks, it is freed automatically by overriding operation of the spool actuating mechanism.

Still another object of the present invention is to provide a new and improved inching valve means for industrial lift trucks and like vehicles which is universally adaptable for either hydraulic or mechanical operation at the manipulation of a foot pedal associated with the vehicle's braking system.

Figure 4:
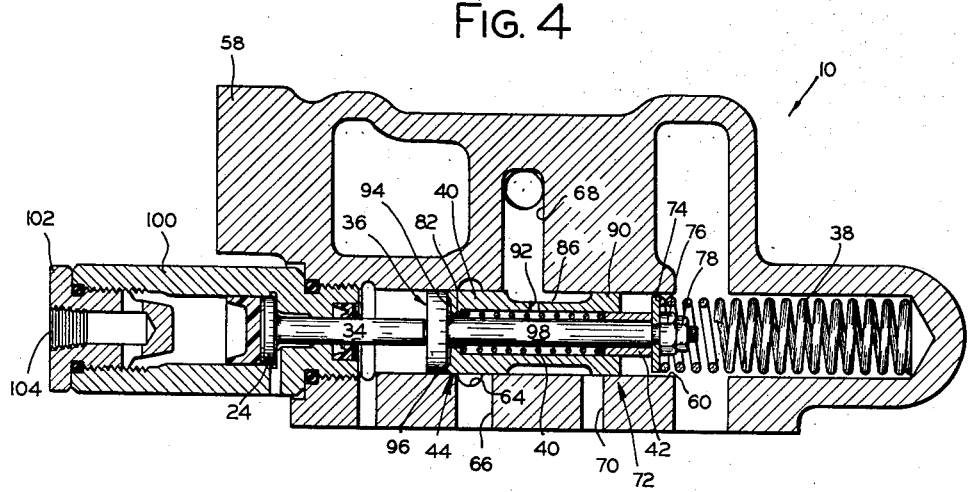

The above and other objects, features and advantages of the present invention will become more readily apparent to those familiar with the art from the following detailed description of a preferred embodiment thereof as shown in the accompanying drawing forming a part hereof and wherein:

FIGURE 1 is a schematic representation of a typical fluid system in which the improved valve of the present invention finds utility, FIGURE 2 is a longitudinal cross-section of an actual valve structure for use in a fluid system as shown in FIG. 1, and FIGURES 3 and 4 are similar to FIG. 2 with the valve spool in the two extreme operating positions.

As seen in FIG. 1, the new and improved regulating valve 10 of the present invention is employed in a fluid circuit of an industrial lift truck. The fluid circuit includes a pump 14 which draws fluid from a reservoir or sump 11 through a conduit 13 and supplies pressurized fluid to valve 10 through inlet conduit 12. Valve 10 serves to control the pressure of fluid supplied by way of inlet conduit 12 from the pump 14, which may be driven by the engine of the vehicle, to a conduit 16 leading to a clutch direction selector 18. Selector 18 controls the actuation of reverse and forward pressure actuated clutches 20 and 22, respectively, in the transmission of the vehicle. It will be appreciated that there is ordinarily a continuous flow of pressurized fluid to the engaged clutch in an apparatus of this type to make up for leakage, and sometimes because of a bleed hole in the clutch chamber which remains open; thus making it possible to regulate clutch engaging pressure by regulating the flow of fluid to the engaged clutch. Valve 10 includes a piston 24 which is shiftable in response to actuation of the brake pedal of the vehicle indicated at 26. Brake pedal 26 is connected with piston 24 by a suitable linkage system indicated generally at 28. The piston 24 is actuated by hydraulic means, in this instance, by conducting fluid thereto by means of a conduit connection 30 with the master cylinder 32 of the braking system of the vehicle as will appear hereinafter in connection with the description of a specific preferred embodiment of the invention.

Rightward movement of piston 24 is transmitted by means of a piston rod 34 to an inner spool member 36 which moves toward the right against the bias of a compression spring 38 which serves as a return spring. This results in the elongation of another compression spring 40 which serves as a regulating spring and is located between a spring retainer sleeve 42 and an outer spool member 44. This elongation of regulating spring 40 reduces the force exerted by it on outer spool member 44. During operation, the outer spool member 44 has fluid pressure exerted on the left end thereof tending to move it toward the right, and the force from such fluid pressure shifts outer spool 44 to the right when the bias of regulating spring 40 is reduced. As outer spool member 44 shifts toward the right, the land portion 46 thereon gradually closes off conduit 12 and restricts the flow of fluid from the pressure source to the vehicle clutch. Sufficient movement of outer spool member 44 to the right causes conduit 12 to be cut off entirely and connects conduit 16 with a return conduit 48 which communicates with fluid reservoir 11. An intermediate movement of inner spool member 36 produces a regulating action which provides controlled restriction of fluid flow from the pump 14 to the vehicle clutch.

Under normal operating conditions of the vehicle, that is, with the brakes released, pressurized fluid from the inlet conduit 12 flows at full supply pressure through the regulating valve 10 and thence into the conduit 16 whereby it is delivered to direction selector means 18 which controls operation of the fluid clutch mechanisms 20 and 22 of the vehicle. Such direction selector means includes a double-acting valve spool 52 herein disposed transversely of the direction selector means. Positioning of spool 52 is in response to actuation of a selector control lever (not shown) available to the operator of the vehicle. The positioning of selector spool 52 serves to control the passage of pressurized fluid to conduits 54 or 56, and thus serves to control the operation of reverse and forward transmission direction clutches 20 and 22. In this regard, note that the spool 52 has three positions of operation, neutral as shown in FIG. 1, or to either side of the neutral position to selectively admit pressurized fluid to either of the two direction clutches 20 and 22.

Next, reference is made to FIGS. 2, 3 and 4 for a more detailed showing of the invention. The valve 10 includes an elongated body 58 having a longitudinally extending bore 60 therein. Communicating with bore 60 is an inlet port 62 which connects with inlet conduit 12 (FIG. 1) so that pressurized fluid from pump 14 is communicated to bore 60. Inlet port 62 includes an annular groove 64 which is cast in body 58 and a drilled passage 66 communicating therewith. Passage 66 is drilled because it provides a means of locating the edges of inlet port 62 within very close tolerances, the importance of which will become clear as the description of this valve progresses. Also communicating with bore 60 is an outlet port 68 cast in body 58 and connecting with conduit 16 (FIG. 1) and a return port 70 which connects with return conduit 48 (FIG. 1). As will be noted, outlet port 68 is disposed intermediate inlet port 62 and return port 70.

Slidably disposed in bore 60 of valve body 58 is a spool 72 which controls the fluid flow between inlet port 62 and outlet port 68 and between outlet port 68 and return port 70. The spool 72 is actually an assembly of parts including outer spool member 44, inner spool member 36, regulating spring 40, spring retainer sleeve 42 and an annular stop member 74, the entire assembly being held together by a pair of cooperating nuts 76 and 78 which lock in position.

The outer spool member 44 has a longitudinally extending bore 80 with an inwardly projecting portion 82 at the left end of the bore. The bore contains a regulating spring 40 and portion 82 provides a shoulder 84 against which regulating spring 40 abuts. The outer spool member 44 also includes an annular groove 86 in the outer periphery thereof. Annular groove 86 defines annular lands 46 and 90 disposed at opposite ends of outer spool member 44 which serve to control communication of inlet port 62 and return port 70 with bore 60, respectively. The annular groove 86 is connected to bore 80 by means of a connecting passage 92 so that fluid pressure in outlet port 68 is communicated to the left end of outer spool member 44 adjacent land 46, which end may include a recess 94.

The inner spool member 36 is mushroom-shaped and includes a flange portion 96 and a rod portion 98 which extends through portion 82 of outer spool member 44 and provides clearance therebetween so as to permit pressure fluid to flow from bore 80 to recess 94.

Regulating spring 40 is disposed around rod portion 98 in bore 80 and is held in abutment with shoulder 84 by spring retainer sleeve 42 which likewise is disposed on rod portion 98 and in turn is held in position by stop member 74 and nuts 76 and 78 which threadably engage rod portion 98, thus completing the assembly of spool 72. At this point it will be noted that outer spool member 44 is biased into abutment with flange portion 96 of inner spool member 36 by regulating spring 40, unless sufficient fluid pressure from outlet port 68 is communicated to recess 94 to overcome the bias of regulating spring 40.

Threadably connected to valve body 58 is a cylinder member 100 which is disposed coaxially with bore 60 and extends a short distance thereinto. Slidably disposed in cylinder 100 is piston 24. Integral with piston 24 is piston rod 34 which extends through one end of cylinder 100 into bore 60 to engage flange portion 96 of inner spool member 36. The open end of cylinder 100 is sealed by a closure element 102 which is provided with an aperture 104 for connection with conduit 30 (FIG. 1) of the vehicle brake system for directing fluid under pressure into the cylinder at the left side of piston 24.

Return spring 38 is disposed in bore 60 between stop member 74 and the adjacent end of the bore and tends to bias inner spool member 36 into abutment with the portion of cylinder 100 which is threaded into bore 60 and serves as a stop, thus limiting the movement of inner spool member 36 toward the left.

At this point it will be appreciated that inner spool member 36 is actuatable between a first extreme position (FIG. 3) when the flange portion 96 is held in abutment with cylinder 100 by return spring 38 and a second extreme position (FIG. 4) determined by the point at which piston 24 bottoms on cylinder 100. Also, it will be noted that movement of inner spool member 36 from the first extreme position to the second extreme position decreases the compression loading of regulating spring 40.

Although not described herein, regulating valve 10 is provided with suitable sealing means for preventing fluid leakage, and suitably disposed vent passages to prevent the building up of pressure from leakage fluid in the valve.

I will now describe the operation of my invention. When the lift truck is traveling forwardly in the normal manner, the regulating valve is in an inactive position (FIG. 3) whereby the fluid communication between pump 14 and forward clutch 22 is unrestricted. In this condition of regulating valve 10 the fluid pressure acting on the end of outer spool member 44 adjacent flange portion 96 of inner spool member 36 holds the outer spool member 44 against stop member 74, and since there is no fluid pressure acting on piston 24 the return spring 38 is holding the inner spool member in abutment with cylinder 100. Now, assuming that the operator desires to "inch"

the lift truck, he depresses brake pedal 26 with his foot thereby initiating application of the vehicle brakes and at the same time exerting fluid pressure on piston 24, causing it to move toward the right. Rightward movement of piston 24 results in rightward movement of inner spool member 36 against the bias of return spring 38. Outer spool member 44 will move along with inner spool member 36 until land 46 covers inlet port 62 with the result that the fluid pressure in regulating valve 10 drops from the full clutch engaging pressure of about 185 p.s.i. to a regulating pressure which, for example, may range from a maximum of 30 p.s.i. to a minimum of 5 p.s.i. The outer spool member 44 continues to block communication of inlet port 62 with bore 60 until the fluid pressure contained in valve 10 drops to the point where the force exerted on the end of outer spool member 44 by the pressure fluid is in balance with the opposing force exerted by regulating spring 40. At this point the outer spool member 44 will be in the regulating position shown in FIG. 2. So long as outer spool member 44 is serving to regulate the fluid pressure being delivered to forward clutch 22 it maintains substantially the position shown in FIG. 2, moving slightly to the left to open communication with inlet port 62 to compensate for a pressure drop caused by fluid leaking from the clutch, for example, and moving slightly to the right to close communication with inlet port 62 to compensate for a pressure rise.

As pointed out previously the position of inner spool member 36 determines the force exerted by regulating spring 40 on outer spool member 44 which in turn determines the pressure maintained in forward clutch 22 by this regulating valve. Continued rightward movement of inner spool member 36 caused by increased pressure on brake pedal 26 causes a continued decrease of the pressure maintained in the clutch. When through continued rightward movement of inner spool member 36 the flange portion 96 thereof just abuts outer spool member 44, the outer spool member 44 will be maintaining the minimum regulated pressure which, for example, may be on the order of 5 p.s.i. When the flange portion 96 of inner spool member 36 is in abutment with the adjacent end of outer spool member 44 it is no longer possible to regulate at a lower level the fluid pressure to clutch 22 because any further movement of outer spool member to the right to the position shown in FIG. 4 prevents communication of bore 60 with inlet port 62, and so drops the pressure to zero because of the fluid flow from the clutch as explained hereinabove. Further, an additional leftward movement of spool member 44 of approximately 1/64 of an inch communicates bore 60 with return port 70, and thereby assures zero gauge pressure in the clutch. As a practical matter, an operator cannot control the movement of spool member 44 within this 1/64 of an inch movement through the manipulation of brake pedal 26.

Assuming now that the operator has depressed brake pedal 26 so that outer spool member 44 is maintaining a regulated pressure to clutch 22 intermediate the minimum and maximum regulated pressures, the disposition of the movable parts of the regulating valve 10 will be substantially as shown in FIG. 2. By allowing the brake pedal 26 to return to its normal position, the force exerted by brake pressure fluid on piston 24 is decreased so that inner spool member 36 is caused to move toward the left by return spring 38 with the result that the compression of regulating spring 40 increases, and thus the regulated pressure being maintained by outer spool member 44 also increases. When the stop member 74 finally comes into abutment with the adjacent end of outer spool member 44 the outer spool member 44 will be maintaining the maximum regulated pressure for inching operation, which pressure may, for example, be approximately 30 p.s.i. Further leftward movement of inner spool member 36 carries outer spool member 44 along with it. Since approximately 1/64 of an inch of travel of outer spool member 44 to the left from its regulating position results in full pressure being delivered to the clutch, it is virtually impossible for the operator to position outer spool member 44 over this distance of travel to further regulate the fluid pressure being communicated to clutch 22, and so for all practical purposes the fluid pressure to the clutch jumps from the maximum regulated inching pressure of about 30 p.s.i. to the full system pressure which may be on the order of 185 p.s.i.

From the above description of operation it will be apparent that as spool member 36 approaches either of its two extreme positions (FIGS. 3 and 4) spool member 44 is positively engaged by and carried along with member 36. Consequently, should spool member 44 happen to stick in the regulating position (FIG. 2) the positive engagement of spool member 36 with it when moving to one extreme position generally will free it.

The above description of a preferred embobiment of my invention is intended to be illustrative only, and the scope of my invention should be determined from the following appended claims taken in conjunction with the prior art.

I claim:
1. A regulating valve comprising an elongated body having a longitudinally extending bore therein, inlet and outlet ports in said body which communicate with said bore, a spool slidably disposed in said bore, said spool including an inner spool member actuatable between a first position and a second position, said inner spool member having a flange portion and a rod portion, an outer spool member having a bore therein through which said rod portion extends in freely slidable relation, said outer spool member being operable to connect said inlet port with said outlet port and actuatable into abutment with said flange portion, means for retaining said outer spool member on said rod portion and resilient means tending to bias said outer spool member into abutment with said flange portion, fluid passage means connecting said outlet port with the end of said outer spool member adjacent said flange portion, resilient means disposed in said first-mentioned bore for biasing said inner spool member toward said first position, and means for actuating said inner spool member toward said second position against the bias of said last-mentioned resilient means.

2. A regulating valve comprising an elongated body having a longitudinally extending single diameter bore therein, inlet and outlet ports in said body communicating with said bore, a spool slidably disposed in said bore, said spool including an outer spool member having an annular groove in the periphery thereof for connecting said inlet port with said outlet port and a longitudinally extending bore therein, fluid passage means in said outer spool member connecting said groove with one end of said outer spool member, an inner spool member having a flange portion and a rod portion, said rod portion extending through said second-mentioned bore and freely slidable therein, a stop member for retaining said outer spool on said rod portion and a regulating spring carried by said rod portion for biasing said one end of said outer spool member into abutment with said flange, stop means for limiting the movement of said spool in one direction, return spring means for biasing said spool into abutment with said stop means and means for actuating said spool against the bias of said return spring.

3. A regulating valve comprising an elongated body having a longitudinally extending bore with a closed end, inlet and outlet ports in said body which communicate with said bore, a unitary spool assembly slidably disposed in said bore, said assembly including an inner spool member having a flange portion and a rod portion, an outer spool member with a bore therein through which said rod portion freely extends, said outer spool member being operable to control communication between said inlet port and said outlet port and actuatable into abutment with said flange portion, resilient means tending to bias said outer spool member into abutment with said flange portion and means for retaining said outer spool member and said resilient means on said rod portion, fluid passage means connecting said outlet port with the end of said outer spool member adjacent said flange portion, means for retaining said spool assembly in said first-mentioned bore, resilient means disposed in said first-mentioned bore between said closed end and said inner spool member and which tends to bias said inner spool member into abutment with said spool assembly retaining means, and means for actuating said inner spool member a predetermined distance against the bias of said second-mentioned resilient means.

4. A regulating valve comprising an elongated body having a longitudinally extending single diameter bore therein, inlet and outlet ports in said body which communicate with said bore, a unitary spool assembly slidably disposed in said bore, said assembly including an inner spool member actuatable between a first position and a second position, said inner spool member having a flange portion and a rod portion, an outer spool member having a longitudinally extending bore and an inwardly projecting portion therein through which said rod portion freely extends, an annular groove in the outer periphery thereof and a passage connecting said groove and said second-mentioned bore, said outer spool member being operable to connect said inlet port with said outlet port via said annular groove, a stop member fixed to the end of said rod portion opposite said flange portion, a spring retainer sleeve carried by said rod portion and disposed adjacent said stop member and a regulating spring disposed in said second-mentioned bore and abutting said inwardly projecting portion at one end and said spring retainer sleeve at the other end, a return spring disposed in said first-mentioned bore for biasing said inner spool member toward said first position, and means for actuating said inner spool member toward said second position against the bias of said return spring.

5. A regulating valve comprising an elongated body having a longitudinally extending bore therein, inlet, outlet and return ports in said body communicating with said bore, said outlet port being disposed intermediate said inlet and return ports, a unitary spool assembly slidably disposed in said bore, said assembly including an outer spool member having a longitudinally extending bore and an inwardly projecting portion therein, an annular groove in the outer periphery and intermediate the ends thereof for connecting said inlet port with said outlet port or connecting said outlet port with said return port, a recess in one end of said outer spool member and a passage connecting said groove and said second-mentioned bore, an inner spool member having a flange portion disposed adjacent said recess and an elongated rod portion slidably passing through said second-mentioned bore, a stop member connected to said rod portion adjacent the end opposite said flange portion for retaining said outer spool member on said rod portion and a regulating spring disposed in said second-mentioned bore for biasing said outer spool member into abutment with said flange portion of said inner spool member, and means for actuating said inner spool member between two extreme positions, said means including a cylinder member connected to said body which serves as a stop for said inner spool member, a piston slidably disposed in said cylinder, a piston rod connected to said piston and extending through one end of said cylinder to engage said flange portion of said inner spool and actuate said inner spool member toward one of said positions and a return spring disposed in said bore for biasing said inner spool member toward the other of said positions in abutment with said cylinder member.

6. A regulating valve comprising an elongated body having a longitudinally extending single diameter bore therein, an inlet port and an outlet port in said body which communicate with said bore, a spool slidably disposed in said bore, said spool including a first spool member actuatable between two extreme positions and having a rod portion, a second spool member operable to control fluid flow between said inlet and outlet ports and having a bore therein through which said rod portion freely extends, resilient means tending to bias said second spool member to a position establishing unrestricted flow between said inlet and outlet ports, means including a passage connecting said outlet port with said second-mentioned bore for fluidly unbalancing said second spool member by applying the pressure of fluid in said outlet port to one end of said second spool member in opposition to the biasing action of said resilient means, and resilient means for biasing said first spool member toward one of said extreme positions.

References Cited in the file of this patent

UNITED STATES PATENTS

| | | |
|---|---|---|
| 2,950,734 | Hasbany | Aug. 30, 1960 |
| 2,965,120 | Snyder | Dec. 20, 1960 |